US005745719A

United States Patent [19]
Falcón

[11] Patent Number: 5,745,719
[45] Date of Patent: Apr. 28, 1998

[54] COMMANDS FUNCTIONS INVOKED FROM MOVEMENT OF A CONTROL INPUT DEVICE

[76] Inventor: Fernando D. Falcón, Fray Justo Santa Maria de Oro 2511 10B (1425), Buenos Aires, Argentina

[21] Appl. No.: 375,119

[22] Filed: Jan. 19, 1995

[51] Int. Cl.$^6$ .................................................. G06F 3/00
[52] U.S. Cl. ............................................. 395/358; 345/145
[58] Field of Search ................................. 345/145, 179, 345/156–157; 395/159, 161, 143, 358; 382/181, 186–187

[56] References Cited

U.S. PATENT DOCUMENTS

| | | | |
|---|---|---|---|
| 4,994,795 | 2/1991 | MacKenzie | 345/153 |
| 5,063,289 | 11/1991 | Jasinski et al. | 250/221 |
| 5,122,785 | 6/1992 | Cooper | 345/163 |
| 5,261,054 | 11/1993 | Lerner et al. | 345/163 |
| 5,313,229 | 5/1994 | Gilligan et al. | 345/157 |
| 5,467,407 | 11/1995 | Guberman et al. | 382/186 |
| 5,477,236 | 12/1995 | Nanbu | 345/145 |
| 5,481,278 | 1/1996 | Shigematsu et al. | 345/156 |
| 5,481,625 | 1/1996 | Suzuki | 382/187 |
| 5,509,114 | 4/1996 | Moran et al. | 395/143 |
| 5,517,578 | 5/1996 | Altman et al. | 382/181 |
| 5,559,897 | 9/1996 | Brown et al. | 382/186 |
| 5,564,005 | 10/1996 | Weber et al. | 395/161 |
| 5,570,113 | 10/1996 | Zetts | 345/156 |

*Primary Examiner*—Mark R. Powell
*Attorney, Agent, or Firm*—Christensen O'Connor Johnson & Kindness PLLC

[57] ABSTRACT

A method for expanding the command capabilities of pointing devices based on periodically sampling a cursor's position on a display device and analyzing the time-variation of a cursor-heading signal obtained from said samples. Upon detecting characteristic cursor-heading time-variation profiles in the cursor trajectory, commands signals are generated so that moving the cursor along particular trajectories is equivalent to activating virtual-buttons of said pointing device. A plurality of applications of the invention and a variety of embodiments are discussed.

23 Claims, 11 Drawing Sheets

COMMAND MOVEMENT

| KEY STATUS | | = ← | ↑↓ | ↻ | ↺ |
|---|---|---|---|---|---|
| | CONTROL + SHIFT | APPLICATION 1 | APPLICATION 2 | APPLICATION 3 | APPLICATION 4 |
| | SHIFT | MACRO 1 | MACRO 2 | MACRO 3 | MACRO 4 |
| | CONTROL | CUT | UNDO | PASTE | COPY |
| | NONE | POP-UP 1 | POP-UP 2 | POP-UP 3 | POP-UP 4 |

| COMMAND MOVEMENT | | | | |
|---|---|---|---|---|
| | ⊐→ | ⊏← | ↻ | ↺ |
| CONTROL + SHIFT | APPLICATION 1 | APPLICATION 2 | APPLICATION 3 | APPLICATION 4 |
| SHIFT | MACRO 1 | MACRO 2 | MACRO 3 | MACRO 4 |
| CONTROL | CUT | UNDO | PASTE | COPY |
| NONE | POP-UP 1 | POP-UP 2 | POP-UP 3 | POP-UP 4 |

KEY STATUS

Fig. 6

COMMANDS FUNCTIONS INVOKED FROM MOVEMENT OF A CONTROL INPUT DEVICE

FIELD OF THE INVENTION

The present invention relates to hand-operated computer input devices, specifically to those which are used to control the position of a cursor or pointer in a display system.

BACKGROUND OF THE INVENTION

Pointing devices belong to the sort of computer input devices that have become greatly accepted among personal computer users. Computer input devices of this kind are disclosed for example in U.S. Pat. No. 5,122,785 issued to Cooper, or in U.S. Pat. No. 5,063,289 issued to Jasinski. Among the most used pointing devices are the mouse and the trackball, although other input devices such as the light-pen and the joystick are also found in more specific applications. Hereinafter, a mouse or other functionally similar pointing device are referred to by either term.

Originally, pointing devices have been used primarily for graphic computer applications. With the advent of graphical computer-user interfaces such as the Windows™ operating system developed by Microsoft Corporation, these devices have become of great usefulness for a large variety of applications, thanks to many interface concepts derived from the basic pointing function performed by these devices.

All these interface concepts require driving the cursor to specific screen areas where software objects representing program tools or data items are displayed (e.g., buttons, icons, text strings, etc.), and pressing or releasing one or more mouse push-buttons at those screen areas. The interface's algorithms derive user commands according to spatial relationships between the displayed objects and the cursor position, at the time one or more mouse buttons change state (i.e., the mouse buttons are pressed or released).

The simplicity of the conventional pointing-device concept and the way it eases operation is the principal cause for its success. However, since a single cursor is used for all operations, an excess in mouse motion from one screen position to the next is produced, requiring a high level of concentration from an operator and an extra effort to point to small and distant screen areas. This is more evident in editing applications where an operator must switch his or her attention between the screen's center (generally displaying the data he or she is working on) and the screen's periphery (where visual objects and command tools are usually displayed).

The increasing flexibility and functionality found in modern computer applications requires an increasing command capability from a pointing device to provide an efficient operation of those programs, so that more program options and commands can be triggered in less time.

A mouse capable of providing concurrent control of cursor position and scrolling is disclosed in U.S. Pat. No. 5,313,229 issued on May 17, 1994, to Gilligan and Falcón. The disclosed mouse relies on the addition of a supplementary control means for generating a scrolling-control signal, which is combined with an operational method to set the scrolling direction by analyzing the dominant axis present in a cursor trail (hereinafter "dominant axis method"). The dominant axis method takes advantage of the information present in the cursor trail to modify the action performed by the supplementary control means and provide two-dimensional scrolling control using a one-dimensional control device. This approach improves performance by allowing concurrent cursor position and scrolling control, and with less effort, compared to a conventional mouse. However, all other operations must be done through the conventional method.

A usual way of adding command capabilities to a conventional mouse is by increasing the number of physical push-buttons, which can be assigned for triggering program commands without carrying the cursor to specific screen areas. This is expressed by Lerner in his patent "System For Storing A History Of Sampled Pointer Signals When A Pointer Interrupt Routine Is Interrupted By A Higher Priority Interrupt," when he writes:

A pointing device 108 is used to select command modes and edit the input data, such as, for example, the parameter to query the data base, and provides a more convenient means to input information to the system. Pointing device 108 may also be equipped with a button or buttons 109 which expand the communication capabilities of the pointing device by increasing the number of commands it can generate. (U.S. Pat. No. 5,261,054, column 4, lines 39 through 47)

A sophisticated input device having a large number of buttons is also disclosed in U.S. Pat. No. 4,994,795 to McKenzie. In his patent, McKenzie explains the operation of his pointing device in this way (column 5, line 56, through column 6, line 9):

Finally, most importantly, in many applications, where an input device is used, a video display 50 displays a plurality of commands which are positioned generally to the periphery of the display 50. These commands are activated when the position indicator is positioned on the command. One drawback of such a system is that in order to activate the command, one must leave the present position to position the indicator on the command in order to activate it. If one were performing a very position intensive application such as CAD, CAM, or desktop publishing operation, then difficulty arises in returning to the original position after activation of the command. In the apparatus of the present invention, the host control program 62 can load a macro such that a particular key that is activated would cause one or more of the commands that are displayed in the periphery of the display to be activated without the input device 10 or the indicator being moved. Thus, there is greater control of the indicator by being able to activate the commands without moving the input device or the position indicator to the position of the commands.

The approach taken by McKenzie, although efficient from an operational standpoint, generally results in a high manufacturing cost, and at the same time it requires high finger dexterity from the operator to achieve a satisfactory operation.

It is therefore a fundamental object of the present invention to provide a method for expanding the command capabilities of input devices for enhancing the functionality and performance of computer-user interfaces based on these devices.

It is another object of the present invention to provide a method for the purpose stated above that can be used with any kind of pointing device, regardless of its particular shape or operating principles.

It is a basic object of the present invention to provide a method for the purpose stated above that can be implemented exclusively by software means, so that no hardware modifications or additions need to be done on those devices.

It is still another object of the present invention to provide a method for the purpose stated above that is significantly easy to understand and operate for most computer users.

It is another fundamental object of the present invention to provide a method for the purpose stated above that is compatible with conventional mouse usage methods.

It is still another object of the present invention to provide a method for the purpose stated above that can be implemented in a computer system that is currently in use without any software or hardware modifications.

SUMMARY OF THE INVENTION

According to the invention, the method for expanding the command capabilities of input devices is based on obtaining additional command information from a pointing device by analyzing the time-variation of a cursor-heading signal while a cursor is moved over the computer's screen, and dynamically triggering specific commands when characteristic cursor-heading variation profiles (hereinafter "turn-profiles") are detected.

For this purpose, a turn-signal is obtained by sampling successive cursor positions at periodic time intervals and calculating the variation of the cursor-heading between successive samples. The acquired turn-signal information is analyzed synchronously at each time interval over several consecutive samples and matched to a plurality of characteristic turn-profiles. Upon detecting substantial similarity with one of the characteristic turn-profiles, a strobe signal is generated for triggering a specific program command associated with the detected profile.

If a conventional mouse-based computer-user interface session is observed, it can be seen that the cursor trajectories generated when moving the cursor from one screen position to the next while none of the mouse push-buttons is pressed tend to be linear trajectories. This is because mouse operators, consciously or unconsciously, tend to use the shortest path to get from one screen position to the next. In other words, curved mouse movements (i.e., mouse movements in which the cursor-heading changes as a function of time) are rarely done in conventional mouse applications. Therefore, a turn-signal obtained from those trajectories gives no meaningful indication, and therefore the method of the present invention can be used simultaneously with the conventional methods, without conflicts between both methods.

In this way, by using the method of the present invention, a conventional mouse can trigger as many program commands as turn-profiles can be defined, without using push-buttons or supplementary control means, and without driving the cursor to specific screen positions. In other words, curved trajectories (i.e., trajectories in which the cursor-heading changes as a function of time) generate additional command information and behave as "virtual buttons" of the pointing device.

Moreover, if the turn-profiles correspond to spot movements (i.e., movements whose cursor-position constellations remain close to a central point), the average cursor position can be used as a coarse pointing indication that is an argument for the triggered command.

In summary, the method of the present invention improves the functionality of mouse-based computer-user interfaces enhancing the command capabilities of a particular pointing device up to the equivalent of a multi-button mouse, regardless of its operating principles, and with no hardware additions or modifications.

BRIEF DESCRIPTION OF THE DRAWINGS

The objects, features and advantages of the present invention will now be illustrated in more detail by the following detailed description, reference being made to the accompanying drawings in which:

FIG. 6 is a table illustrating an enhancement of the method of the present invention based on combining curved mouse movements with keys such as "Control" or "Shift" for expanding even more the set of commands that can be triggered by performing curved mouse movements;

DETAILED DESCRIPTION OF THE PREFERRED EMBODIMENT

Figure 1A:
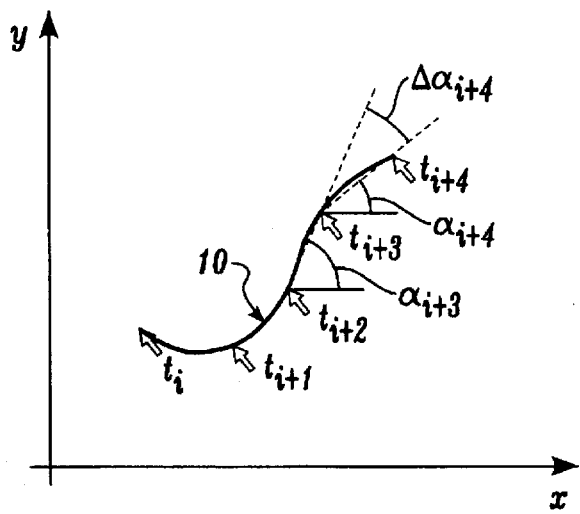
FIG. 1A is an x-y diagram showing an example of a cursor trajectory and its consecutive cursor positions, in which are also represented parameters calculated by a turn-profile detector according to the present invention.
Figure 1B:
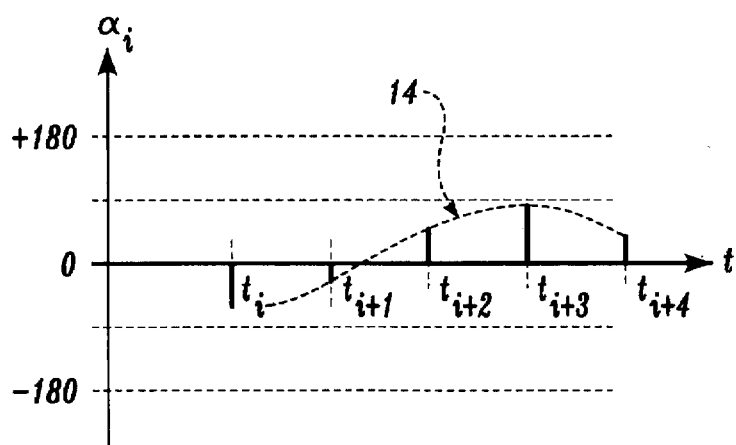
FIG. 1B is an x-y diagram showing a cursor-heading signal derived from the trajectory of FIG. 1A, according to the invention.
Figure 1C:
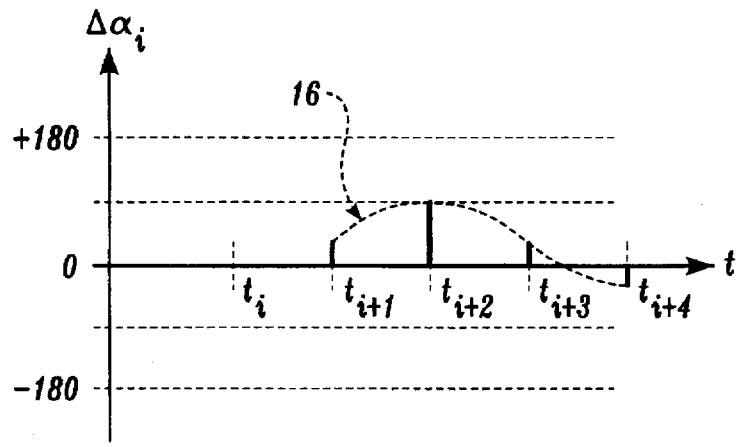
FIG. 1C is an x-y diagram showing a turn-signal derived from the trajectory of FIG. 1A, according to the invention.

' The basic principle of the method of the present invention is depicted in FIGS. 1A through 1C. FIG. 1A shows a cursor trajectory 10, including cursor positions $t_i$ through $t_{i+4}$, which represent successive samples of the x-y position of a cursor 12 at periodic time intervals, as it is moved on a computer display. At times $t_{i+3}$ and $t_{i+4}$, trajectory 10 forms angles $\alpha_{i+3}$ and $\alpha_{i+4}$ respectively, measured clockwise from the x axis. The magnitude of $\alpha_i$ is the cursor-heading. The difference between angles $\alpha_{i+3}$ and $\alpha_{i+4}$ is $\Delta\alpha_{i+4}$ as shown in FIG. 1A, and represents the heading-change or "turn" between both time intervals.

FIG. 1B shows how the cursor-heading evolves in trajectory 10, along the same time span. Curve 14 envelopes a set cursor-heading values obtained on successive samples and is equivalent to the arc-tangent of the first derivative of trajectory 10 with respect to the x axis, represented as a function of time. The set of cursor-heading values will hereinafter be referred to as the "heading-signal."

FIG. 1c shows the heading-change or turn measured at time intervals $t_i$ through $t_{i+4}$. The curve 16 envelopes a set of turn values obtained from the same samples and is the time derivative of curve 14 (called: "turn-signal").

As can be seen in FIGS. 1A through 1C, a curved cursor trajectory like trajectory 10 produces a non-zero turn-signal curve 16. At the same time, a linear trajectory (regardless of its orientation) gives no indication in turn-signal curve 16, since the heading-change is null, or at least very low.

This fact allows the division of all possible mouse movements into two separated sets: conventional mouse movements, which are used to drive the cursor from a first screen position to a second screen position; and, command mouse movements, which are curved mouse movements (i.e., mouse movements in which the cursor-heading changes as a function of time) made at any screen position, such that a command is triggered when a characteristic turn-signal profile is detected.

Figure 2A:
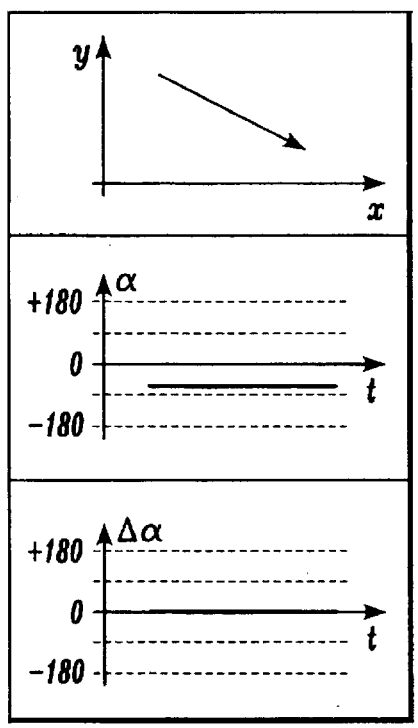
FIGS. 2A through 2E are x-y diagrams showing possible cursor trajectories and their corresponding cursor-heading signals and turn-signals, according to the invention.
Figure 2B:
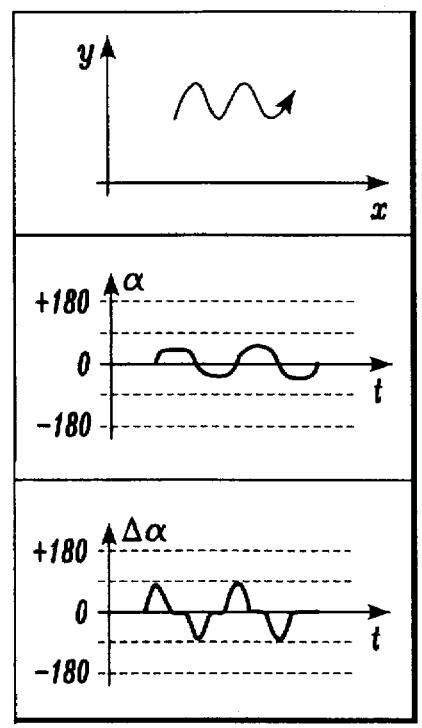
Figure 2C:
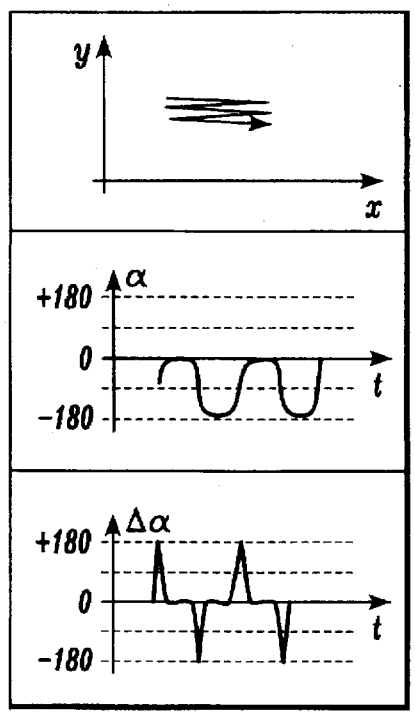
Figure 2D:
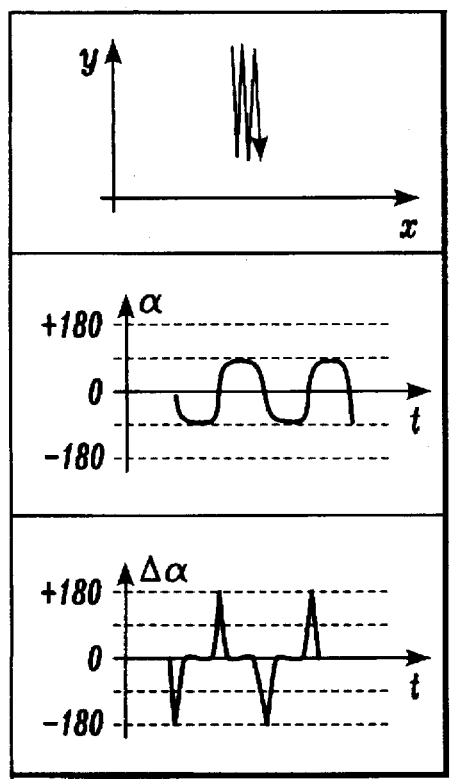
Figure 2E:
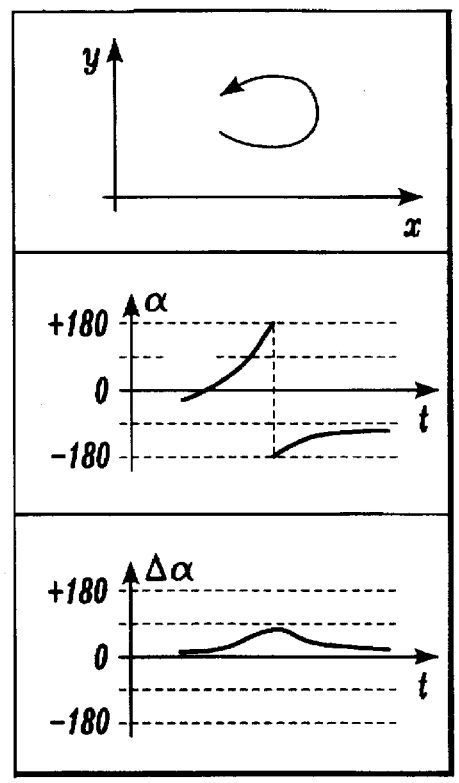

FIGS. 2A through 2E show a plurality of mouse movements and their corresponding heading-signals and turn-signals. FIG. 2A, represents a conventional, substantially linear mouse movement, oriented approximately southeast. As can be seen in FIG. 2A, the turn-signal derived from a linear mouse-movement remains at a very low value throughout the whole movement. On the other hand, all movements in which one or more heading-changes occur during the movement, have non-zero turn-signals. In particular, the movements shown in FIGS. 2B through 2E have clearly recognizable turn-profiles and therefore they can be detected and used as command movements.

Figure 3:
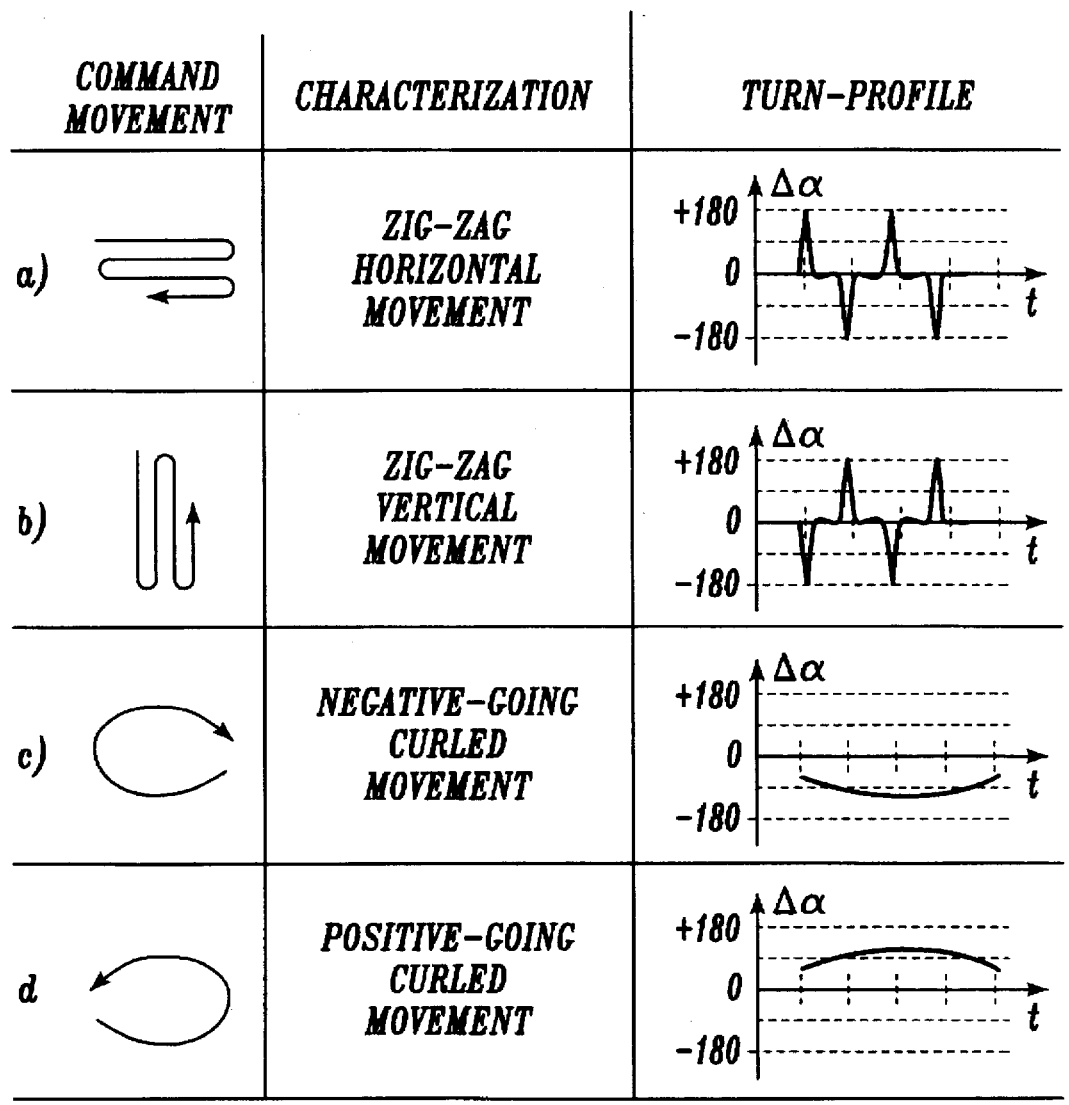
FIG. 3 is a table relating four specific command cursor-movements with their corresponding characterization and associated turn-profiles, according to the invention.

In a preferred embodiment of the method of the present invention, four command movements are used: a zigzag-like horizontally oriented movement; a zigzag-like vertically oriented movement; a negative-going curled movement; and, a positive-going curled movement. These four movements are depicted in FIG. 3, which is a table relating the command movements with their corresponding definitions and turn-profiles.

To explain the usefulness of the method, following is a disclosure of how some typical mouse-based operations like copying and pasting can be accelerated using the method of the present invention.

Figure 4:
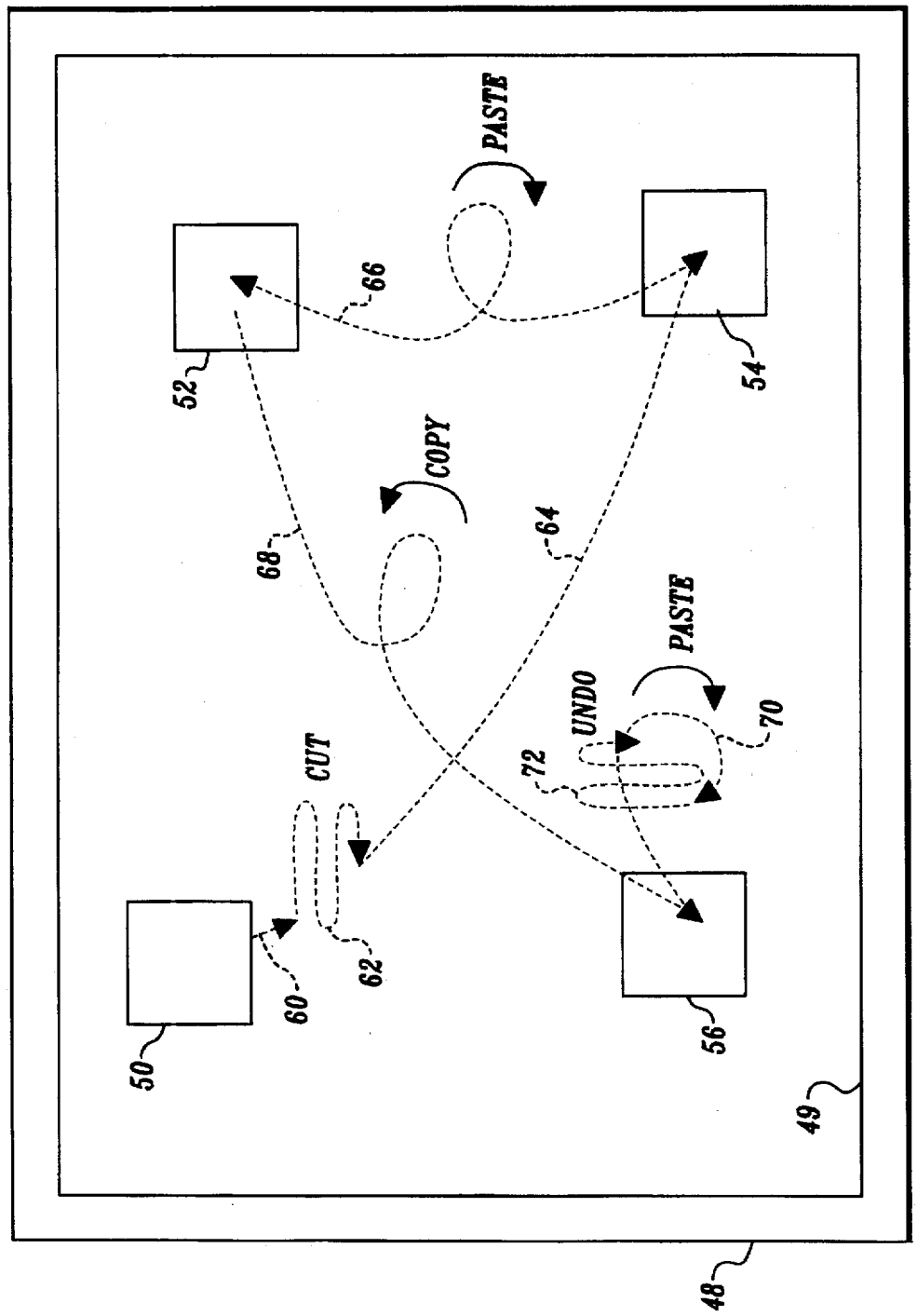
FIG. 4 illustrates a computer session and shows an application of the method of the present invention for triggering editing operations like "copy," "paste," "cut," and "undo"

FIG. 4 depicts a mouse-based computer session. In FIG. 4, rectangle 48 represents a computer screen area displaying a graphic document represented by rectangle 49. Document 49 contains graphic objects represented as rectangles 50, 52, 54, and 56 at respective screen positions. A task is then supposed to be performed including two operations: a) cutting object 50 and pasting it at the position of object 54; and, b) copying object 52 at position of object 56.

Using the conventional method, each of these operations require selecting the objects by clicking over one of them, driving the cursor to another screen area and clicking over a menu-bar or a graphic object assigned for editing functions (not shown in FIG. 4), driving afterwards the cursor to another screen area for selecting a new position for that object, and so on.

Using the method of the present invention, a significant amount of time and effort can be saved, since many of these elementary operations can be performed while the cursor is being moved from one screen position to the next. For this purpose, the four command movements disclosed in FIG. 3 are used and are assumed to be assigned to trigger each of the editing functions as shown in Table 1, which follows:

TABLE I

| Command Movement | Editing Function |
| --- | --- |
| Horizontal Zigzag | Cut |
| Vertical Zigzag | Undo |
| Negative-Going Curl | Paste |
| Positive-Going Curl | Copy |

In FIG. 4, to perform the first operation, the cursor is moved over object 50 for selecting it (usually by clicking over it). After selecting object 50, the cursor is moved along a trajectory comprising three trajectory elements: 60, 62, and 64. After completing trajectory element 60, the operator moves the cursor describing trajectory 62, which is a horizontal zigzag-like mouse movement. According to Table I, as the corresponding turn-profile is detected, the application program performs a "Cut" operation, and object 50 disappears from the screen.

Thereafter, the cursor is moved along a conventional-like trajectory element 64 to get the screen position of object 54. After selecting object 54 for modifying it, the cursor is driven to the screen position of object 52, along trajectory 66, which includes a negative-going curled portion that triggers a "paste" operation on previously selected object 54. In this way, two tasks can be performed at the same time: pasting over object 54 and driving the cursor to object 52, to continue with the next editing operation.

To "cut" object 52 and "paste" it on object 56, a similar approach is used: after selecting object 52, the cursor is driven over object 56 along trajectory 68, which includes a positive-going curled portion for triggering a "copy" operation while the cursor is driven to its destination, so that when the cursor reaches object 56, a "paste" operation is already prepared to be performed. By driving the cursor along trajectory 70, the paste operation is completed. In the same way, if the result of the previous operation is not satisfactory, a zigzag-like vertically oriented movement is performed (trajectory 72) for triggering an "undo" operation.

As shown in the previous example, the method of the present invention saves time, since several operations can be triggered while moving the mouse from one screen position to the next. Moreover, since the movements can be made at an arbitrary screen position and they are characterized by turn-profiles which are clearly detectable, even if they are performed in an inaccurate way, they require no pointing effort from the operator, as conventional mouse operations do.

Another useful application of the method of the present invention is using the commands movements to bring pop-up windows into view on the computer's display, so that additional commands can be triggered by combining the method of the present invention with the conventional method. In other words, the method of the present invention is used for displaying a pop-up window, while the conventional method (i.e., the one based on "pointing-andclicking") is used to select a command from an array of options presented in said pop-up windows.

Figure 5B:
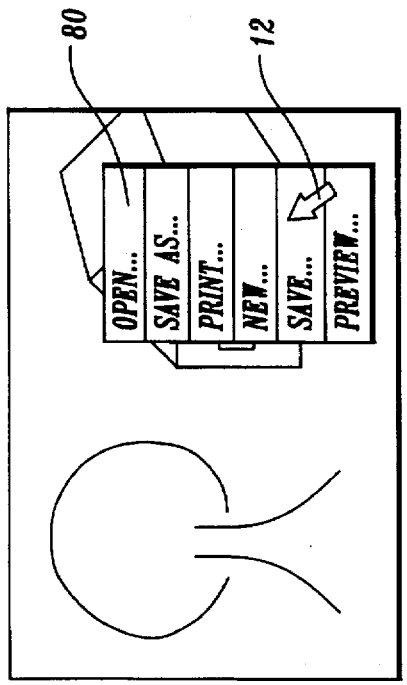
FIGS. 5a through 5d illustrate a computer session and show another application of the method of the present invention for bringing into view pop-up windows by performing curved mouse movements.
Figure 5D:
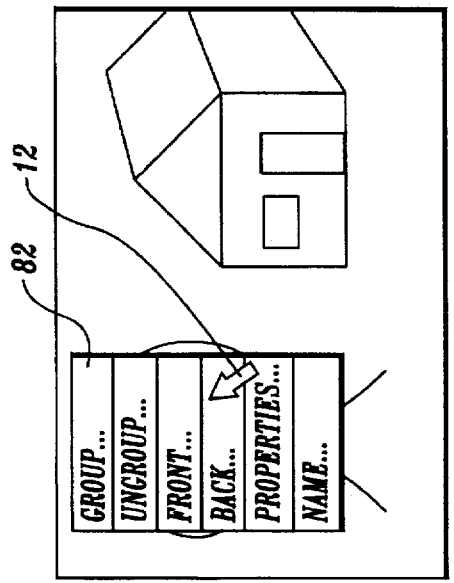
Figure 5A:
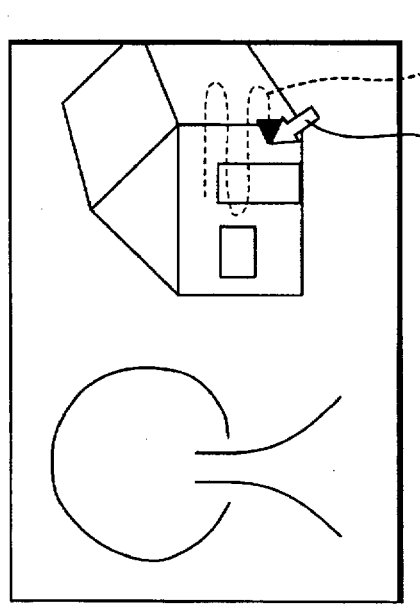
Figure 5C:
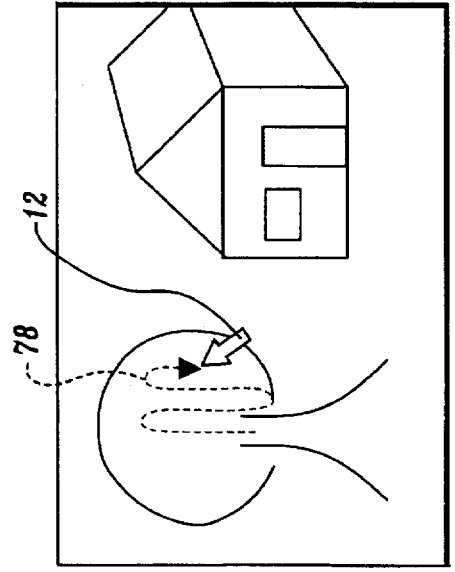

FIGS. 5A through 5D depict a computer session using the method of the present invention for displaying pop-up windows. FIGS. 5A through 5D represent a single computer display image at different times. In FIG. 5A, the operator moves the cursor 12 along a horizontal zigzag trajectory 76. As soon as trajectory 76 is completed and is interpreted by the computer as a command movement, a pop-up window 80 appears on the computer display presenting a plurality of commands, as shown in FIG. 5B. In FIG. 5C the operator now performs a vertical zigzag movement 78 and the computer displays another pop-up window 82, showing a distinct set of commands. Additionally, the average cursor position, measured over the command-movement trajectory, is used as a coarse position indication to determine the position at which the corresponding pop-up window is displayed, so that the shortest distance for further selection of the presented commands is assured.

The pop-up window concept has been widely adopted for accelerating some tasks in contemporary computer application programs. Most of these applications use one of the mouse physical push-buttons for bringing into view one pop-up window. Using the method of the invention, however, a great number of pop-up windows can be defined, since only a mouse movement is needed to bring them into view, and without requiring any mouse push-buttons for that purpose, what leaves those mouse-resources free for any other applications that require more precise pointing.

The method of the present invention has general application for any other task performed with a pointing device. For example, window-management functions like tiling or cascading windows or switching between windows belonging to different programs can also be advantageously triggered using the method of the present invention.

Moreover, the strobe-signals generated when turn-profiles are detected can be combined with keyboard keys to expand the functionality of the method even more. In this way, some keyboard keys can be assigned to modify the meaning of the curved mouse movements, so that a plurality of different program functions can be triggered, according to what keyboard key is pressed at the time a command movement is detected. For example, if the four command movements used in the example of FIG. 4 are modified by the "Shift" and "Control" keys (found in most currently used computer keyboards), up to 16 different commands can be triggered by making a mouse movement and pressing one, or at most two keyboard keys. This is depicted in FIG. 6, which shows all 16 possibilities arranged in a 4×4 matrix. In said matrix, the columns correspond to the command-movements performed, while the rows correspond to the possible combinations of the "Control" and "Shift" keys. In the table shown in FIG. 6, functionally similar commands are arranged by rows for easy remembering of their meaning (e.g., all the editing commands are arranged in the "Control" row).

The general characteristics of the method of the present invention are disclosed hereinabove. Following is the disclosure of how the method of the present invention can be reduced to practice, along with a discussion of several implementations of the method.

Figure 7:
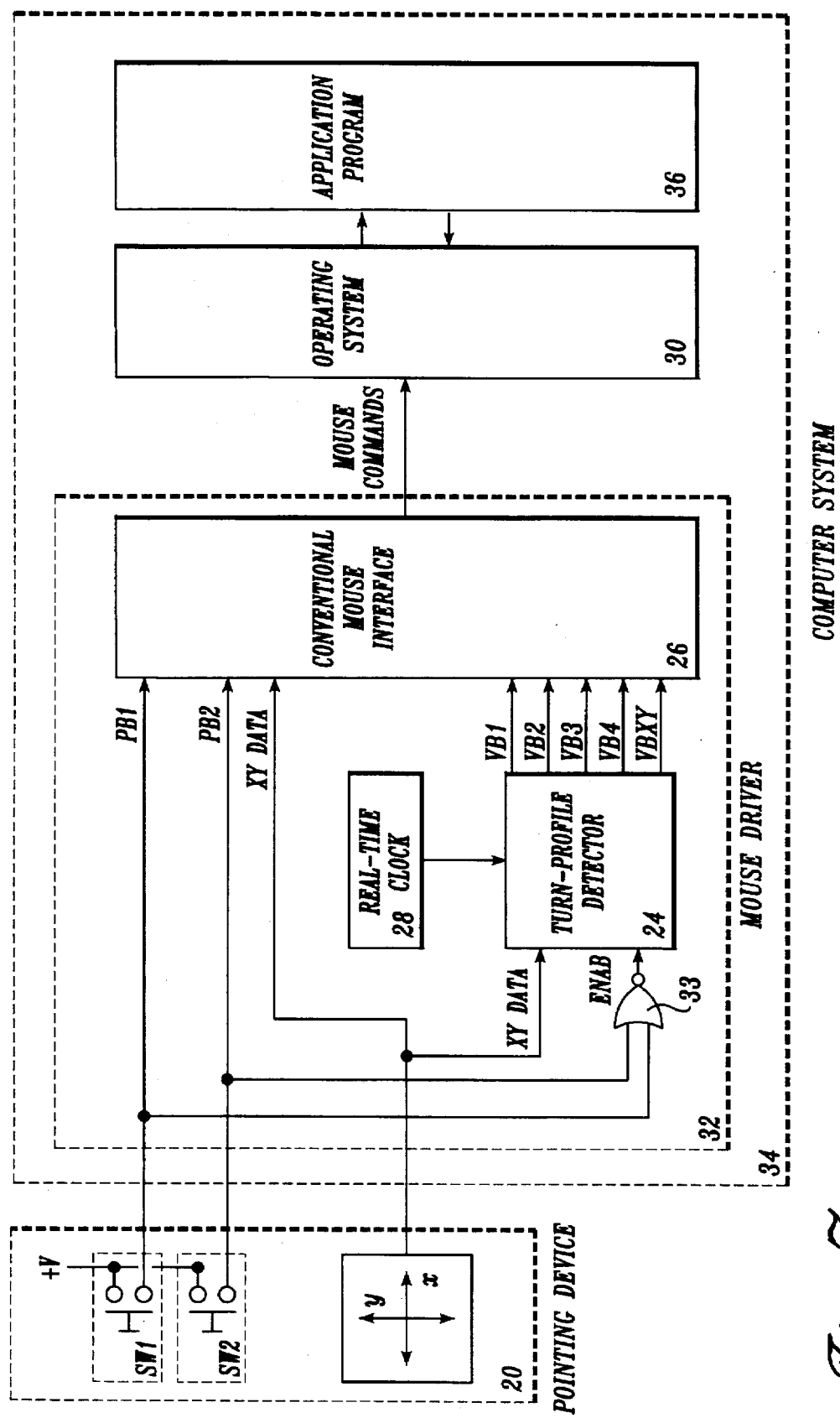
FIG. 7 is a block diagram of a computer system in which the method of the present invention is embodied in a mouse driver.

FIG. 7 shows a block diagram of a first implementation of the method, in a mouse driver arrangement that generates virtual-button signals through curved mouse movements.

In FIG. 7, a conventional pointing device represented by block 20 is shown connected to a computer system represented by block 34. Pointing device 20 comprises an x-y transducer system that generates an x-y vectorial signal XYDATA for driving a cursor on the computer's screen, and two physical push-buttons SW1 and SW2 that generate binary control signals PB1 and PB2, respectively, representative of the push-buttons' status. Pointing device 20 can be connected to computer system 34 by a plurality of means widely known in the art, as for example a serial communications port.

The signals XYDATA, PB1 and PB2 are processed by a mouse driver 32 residing in computer system 34, which translates the signals generated by mouse 20 into software commands that can be processed by an operating system 30, running in computer system 34. Mouse driver 32 can communicate with operating system 30 through interrupt routines or other similar techniques known in the art.

Inside mouse driver 32, the conventional mouse signals XYDATA, PB1 and PB2 are processed by a mouse-interface means 26, which represents all hardware and software means normally included in a mouse driver for interfacing the conventional mouse signals to the rest of the computer system. The output of mouse-interface means 26 is normally processed by operating system 30 and distributed to an application program 36 running in computer system 34.

To implement the method of the present invention, the mouse driver 32 also includes a Turn-Profile Detector means 24 (hereinafter "TPD") that analyzes the cursor movement to detect characteristic turn-profiles. For that purpose, the TPD samples the x-y position information generated by mouse 20 at periodic time intervals, and synchronously builds an internal turn-signal. As a result of detecting one of the characteristic turn-profiles, the TPD generates a corresponding strobe signal indicating that one of the command movements has been performed by the operator. Mouse driver 32 includes a real-time clock source 28 for synchronizing the sampling process of the TPD.

In a preferred embodiment of mouse driver 32, the strobe signals are four: VB1, VB2, VB3, and VB4, corresponding to the four turn-profiles disclosed herein before, in relation to FIG. 3. Since signals VB1–VB4 can be activated from the pointing device (by making curved movements), but without using any hardware for this purpose, they act as "virtual buttons" of pointing device 20, and therefore are read by interface means 26, in the same way as the conventional, physical-button signals PB1 and PB2. The virtual-button signals VB1, VB2, VB3, and VB4, however, are enabled only if none of the physical-button signals PB1 and PB2 are activated. This is because the method of the present invention takes advantage of the information available in curved mouse movements while the cursor is moved from a first cursor position to a second cursor position and no push-button is activated. On the other hand, while either signal PB1 or PB2 is activated, curved mouse movements can occur (e.g., in a free-hand drawing application, while drawing an irregular shape), and in that case the virtual-button signals must be disabled to give priority to the physical-button signals. In FIG. 7, this function is performed by a generic "NOR" digital gate 33.

Moreover, the TPD generates an additional x-y vectorial signal VBXY, which represents the average cursor position of the command movement, and is used as a coarse pointing indication, valid at the time one of the virtual-button signals is activated.

Since the method of the present invention requires processing only the cursor-position data to obtain commands from a mouse, it may be also implemented in an operating system that is currently in use, without even modifying the mouse driver, provided that the operating system has some multitasking capability and includes means for informing to a program running on it about the cursor position and the mouse's push-button status (e.g., the Windows operating system provides this information through the "GetCursorPos" and "GetKeyState" functions).

Figure 8:
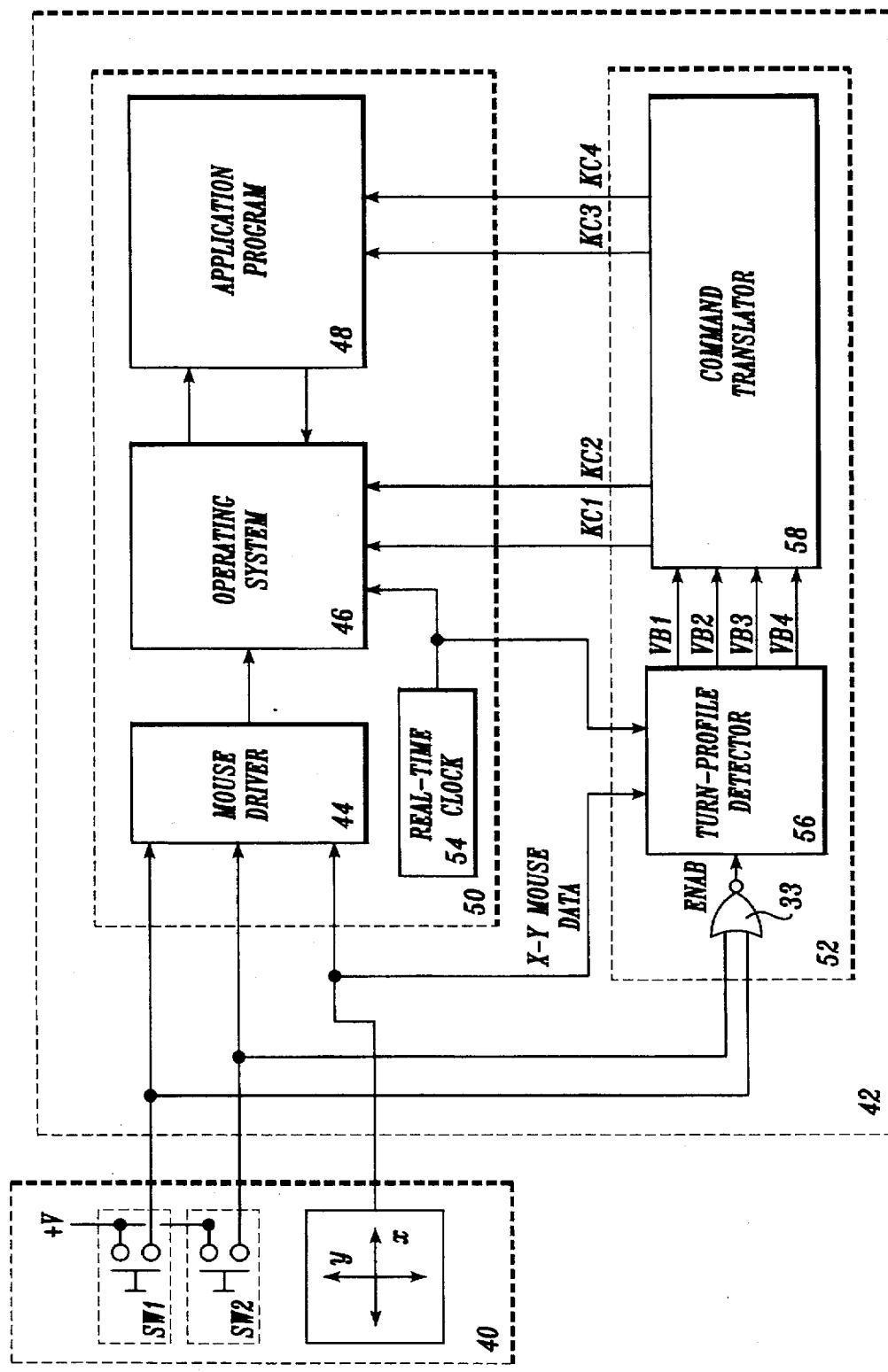
FIG. 8 is a block diagram of a computer system in which the method of the present invention is embodied in an application program.

FIG. 8 is a block diagram of such a second implementation. In FIG. 8, a conventional pointing device 40 is connected to a computer system 42 by any of the known techniques. Computer system 42 includes a conventional mouse driver 44, an operating system 46 including a mouse-based computer-user interface and an application program 48 which runs over operating system 46. Computer system 42 also includes a real-time clock source means 54, which provides timing signals to all software and hardware means contained in computer system 42.

Block 50 encompass all the elements within computer system 42 which are part of a conventional mouse-based computer-user interface.

The method of the present invention can be implemented as a specific application program 52 (from the standpoint of operating system 46), provided that operating system 46 has some multitasking capability so that application program 52 can run periodically governed by real-time clock means 54.

Application program 52 comprises a turn-profile detector means 56 that samples the cursor-position at each real-time event generated by real-time clock means 54, and, upon detection of one of the characteristic turn-profiles, activates a corresponding strobe signal VB1, VB2, VB3 or VB4, as explained herein before. These strobe signals are read by a command translator means 58 that translates the virtual-button signals VB1 through VB4 into command signals KC1 through KC4, which have a format compatible with either operating system 46 or application program 48.

For example, if operating system 46 provides means for emulating keyboard sequences (as, for example, Microsoft Windows operating system does through a technique known as "hooks"), command signals KC1 through KC4 can be keyboard macros that realize the desired operations, keeping full compatibility with currently used application programs. In this way, the editing operations used in the example of FIG. 4 can be triggered by emulating keyboard sequences which are normally used for that purpose (e.g. "Control+C" for "Copy," "Control+X" for "Cut," etc.). However, if keyboard emulation is used for realizing the triggered commands and some keyboard keys are used for modifying said commands (as explained in relation to FIG. 6), care must be taken to emulate the releasing of the modifying keys prior to starting the command key sequences, to avoid an erroneous result.

Since the method of the invention relies exclusively on analyzing the time-variation of the cursor-heading for detecting command actions, it can be implemented "outside" many operating systems currently in use, embodied as an application program written for the target operating system that communicates with the operating system (or with an application program) through keyboard emulation techniques. This greatly reduces the implementation cost and, at the same time, shortens the time needed to provide the benefits of the present invention to contemporary computer users.

The general concept of the method of the invention is disclosed herein above. Following is a disclosure of an exemplary algorithm for detecting turn-profiles that has minimum computing power requirements.

Figure 9A:
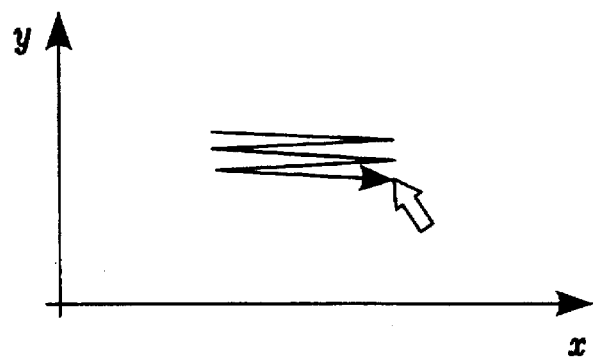
FIG. 9A is an x-y diagram showing a cursor trajectory corresponding to a command mouse movement, according to the invention.

For the purpose of explanation, a zigzag-like command movement as the one represented by trajectory 62 in FIG. 4 is used, and is repeated in FIG. 9A for clarity.

To characterize this command movement, the following contour conditions are imposed on the time-variation of the cursor-heading:

1) The heading-signal should have values close to 0° and 180° exclusively.
2) The turn-signal must remain near 0° and vary abruptly and periodically (only U-turns).
3) The time elapsed between successive turns must be less than a predefined time-out.
4) A pre-defined number of consecutive U-turns must occur to consider the mouse movement a valid command movement.

Figure 9B:
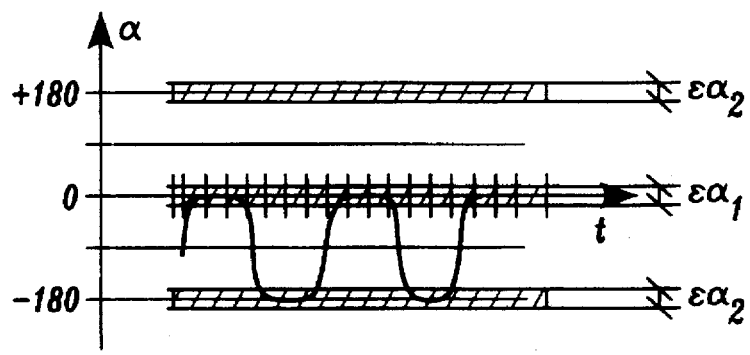
FIG. 9B is an x-y diagram showing a cursor-heading signal derived from the trajectory of FIG. 9A and a first set of parameters used by an algorithm for detecting the command mouse movement of FIG. 9A, according to the invention.

The first condition defines the horizontal orientation of the zigzag movement and is represented in FIG. 9B as heading-signal ranges marked as $\epsilon\alpha1$ and $\epsilon\alpha2$, around the 0° and 180° values, respectively.

Figure 9C:
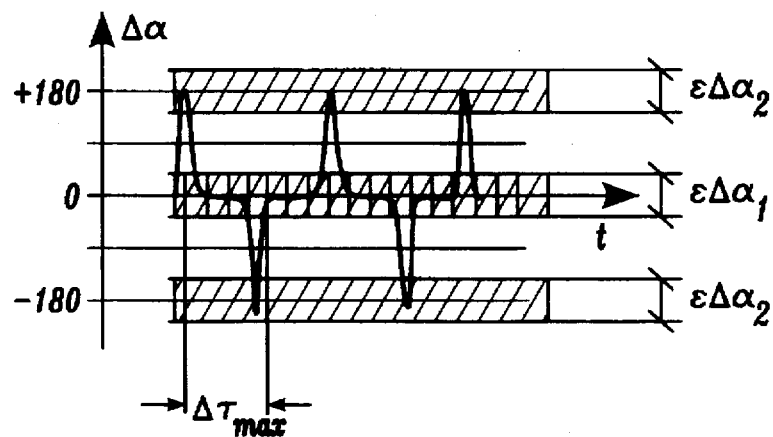
FIG. 9C is an x-y diagram showing a turn-signal derived from the trajectory of FIG. 9A and a second set of parameters used by the same algorithm for detecting the command mouse movement of FIG. 9A, according to the invention.

The second condition is the curved-movement condition, which is essential for differentiating a command mouse movement from a conventional mouse movement, and is represented in FIG. 9C as turn-signal ranges marked as $\epsilon\Delta\alpha1$ and $\epsilon\Delta\alpha2$, around the 0° and 180° values, respectively.

The third condition indirectly defines the time-span in which a command movement is expected to occur. It is represented in FIG. 9c as a maximum time period $\Delta\tau_{max}$.

The fourth condition supplements the rest of the conditions to provide enough differentiation between an intentional command mouse movement, and a conventional mouse movement.

In practice, the following set of parameters has proven to be effective:

| | |
|---|---|
| Real-time Clock Period: | 18 ms |
| $\epsilon\alpha_1$, $\epsilon\alpha_2$: | 20° |
| $\epsilon\Delta\alpha_1$, $\epsilon\Delta\alpha_2$: | 20° |
| $\Delta\tau_{max}$: | 4 ticks |
| Number of U-Turns: | 3 |

Figure 10:
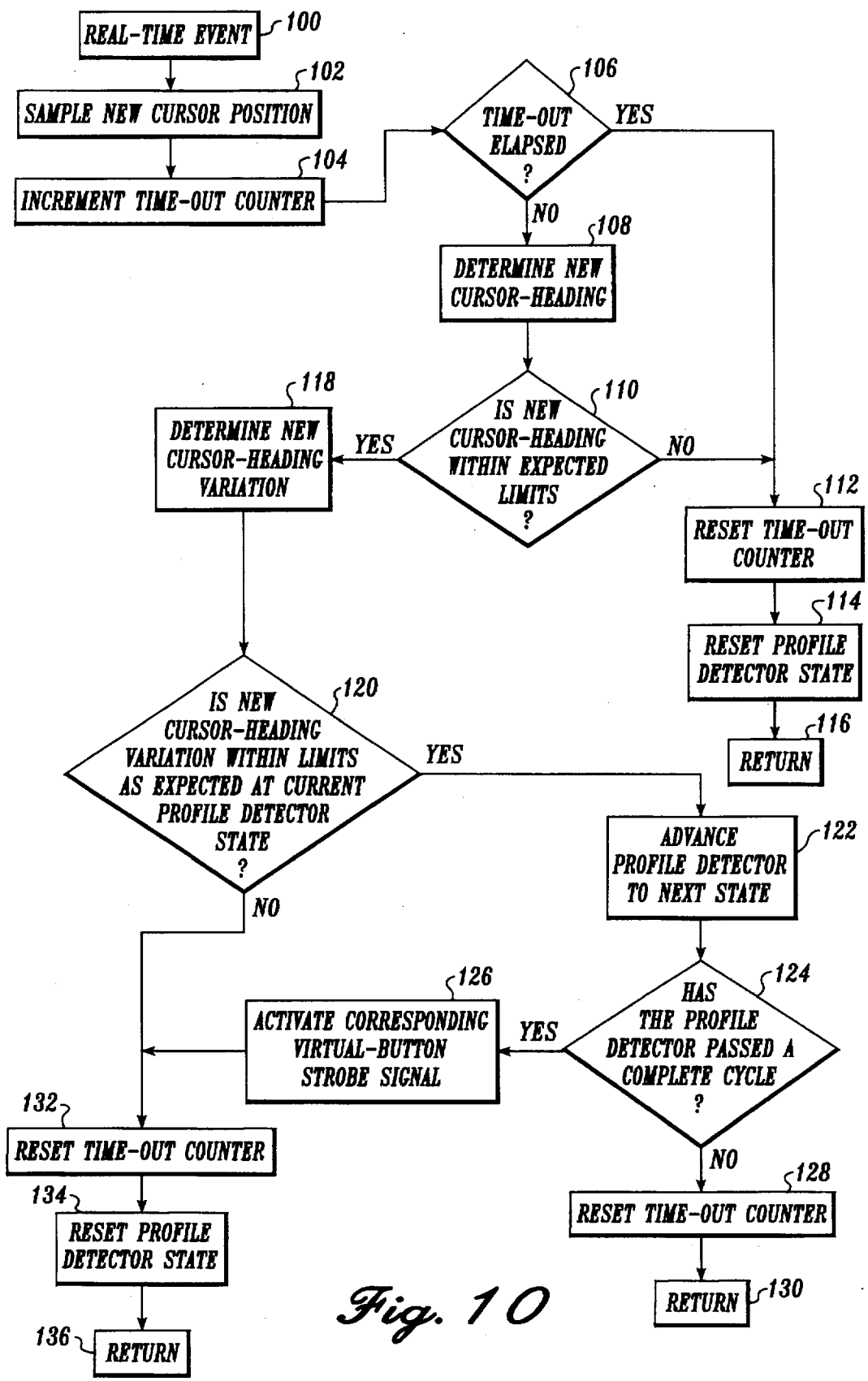
FIG. 10 is a flow diagram of the algorithm used for detecting the command mouse movement of FIG. 9A, according to the invention.

FIG. 10 shows a flow-diagram of a turn-profile detector that is sensitive to the command movement of FIG. 9A. In the flow-diagram of FIG. 10, the detector is built as a state machine that is advanced through an internal cycle as the mentioned conditions are passed, until it reaches a final state in which the command movement is considered detected.

As shown in the diagram of FIG. 10, at each real-time event 100, the cursor position is sampled at 102. Thereafter, a time-out counter is incremented at 104, to measure the time elapsed between two consecutive turns.

Once it is determined that time-out has not elapsed at 106, the new cursor heading is calculated as the slope given by two consecutive samples at 108. If the cursor heading falls outside all the expected ranges (in this case around 0° or 180°) at 110, the detector is reset at 114, and a new detector cycle begins (i.e., the mouse movement is discarded as a command movement) at 112 and 116.

If the previous condition is passed, the new turn is calculated as the difference between the cursor-headings corresponding to two consecutive samples at 118. The cursor-heading variation is then compared to the one expected according to the detector's current state, at 120.

If the new cursor-heading variation falls within the expected values, the detector's state is advanced one step at 122. If the mouse movement is such that all conditions have been met throughout a whole detector cycle at 124, a command movement is considered detected and the corresponding strobe-signal is activated at 126, to inform the rest of the system that a command movement has been performed by the operator. If the conditions have not been met through a complete cycle, the counter is reset and the system returns, at 128 and 130.

If the new cursor-heading variation is not as expected, the detector is reset to its idle state and a new cycle begins at 132–136, since the given movement does not comply with the characteristic turn-profile.

Although a particular command movement has been used as a basis for the explanation, it will be apparent for those skilled in the art that the same approach can be used for detecting other command movements, as long as they comprise curved portions in their trajectories. In that case, additional detectors must progress through their own cycles within each real-time event, each detector with its own particular conditions and number of states. Given a cursor trajectory, eventually one of the detectors will activate its corresponding strobe signal as soon as the trajectory passes all its conditions. After a command movement has been detected, a second time-out counter can be implemented to inhibit detection of other command movements for a certain period of time, to avoid triggering another operation.

In this way, the method of the present invention enhances the command capabilities of input devices, regardless of their shape, operating principles or application, since the additional command information is extracted from the time-variation of the cursor-heading signal, without any interaction with any other element but the pointer's position. The method of the present invention may therefore be implemented in any kind of pointing device or operating system, with minimum requirements and taking advantage of elements available in computer systems currently in use.

While the invention has been illustrated and embodied in a method for enhancing the command capabilities of pointing devices, it is not intended to be limited to the details shown, since various modifications and structural changes may be made without departing in any way from the spirit of the present invention. For example, although the examples disclosed herein include two implementations (i.e., as a mouse driver and as a specific application program), the method of the invention can be directly implemented within an application program or inside an operating system to provide the same features, since the processing needed for its implementation can be done at any programming level. In the same way, although the exemplary algorithms used for detecting characteristic turn-profiles are based on a step-by-step analysis of cursor trajectories (i.e., a state-machine approach), they could be based as well on other techniques like interpreting a constellation of successive cursor positions over a pre-defined trajectory extent and detecting constellation patterns thereof. Those skilled in the art will recognize that other techniques can be used to determine a trajectory with curved portions, essential for differentiating a command mouse movement from a conventional mouse movement. Moreover, the method of the present invention is not limited to plain, x-y Cartesian pointing devices. It will be apparent for those skilled in the art that the curved command-movement concept is still valid in other kinds of reference systems, and therefore can be used in 3D pointing devices, as for example some mouse models currently manufactured by Logitech Corporation in the United States. In that case, additional conditions must be defined for characterizing heading-variation profiles, adapted for the target coordinate system.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The embodiments of the invention in which an exclusive property or privilege is claimed are defined as follows:

1. A method for controlling the operation of a computer system using a pointing device, the computer system including a keyboard having a plurality of keys, a display for displaying visual information, a processor to generate and manage the visual information, and a storage medium, the pointing device being coupled to the computer system and including means for generating movement information to effect the movement of a cursor to any of a plurality of cursor positions at different coordinates on the display, the method comprising the steps of:

(a) storing in the storage medium a representation of the pointing device movement information indicative of a cursor trajectory caused by movement of the pointing device;

(b) calculating a cursor-heading, time variation-profile from the stored representation of the pointing device movement information; and (c) comparing the cursor-heading, time variation-profile with a pre-defined characteristic cursor-heading, time variation-profile and controlling said computer system to execute a predetermined command when the cursor-heading, time variation-profile substantially matches the pre-defined characteristic cursor-heading, time variation-profile.

2. The method of claim 1, wherein the step of comparing the cursor-heading, time variation-profile with a pre-defined characteristic cursor-heading, time variation-profile further comprises the step of comparing the cursor-heading, time variation-profile with a plurality of pre-defined characteristic cursor-heading, time variation-profiles and controlling the computer system to execute a predetermined command when the cursor-heading, time variation-profile substantially matches one of the plurality of pre-defined characteristic cursor-heading, time variation-profiles.

3. The method of claim 2, wherein the step of comparing the cursor-heading, time variation-profile with a pre-defined characteristic cursor-heading, time variation-profile further comprises the step of controlling the computer system to execute one of a plurality of predetermined commands depending upon which one of the plurality of pre-defined characteristic cursor-heading, time variation-profiles substantially matches the cursor-heading, time variation-profile.

4. The method of claim 3, wherein the step of comparing the cursor-heading, time variation-profile with a pre-defined characteristic cursor-heading, time variation-profile further comprises the step of examining a status of one of the plurality of keys on said keyboard, and controlling the computer system to execute one of a plurality of predetermined commands depending upon the status of one of the plurality of keys on the keyboard and the cursor-heading, time variation profile.

5. The method of claim 1, further comprising the step of calculating an average cursor position over an extent of the cursor trajectory to obtain a coarse pointing indication associated with the cursor trajectory at the time the predetermined command is executed.

6. The method of claim 5, further comprising the step of providing the coarse pointing indication to the computer system to control the execution of the predetermined command.

7. The method of claim 1, wherein the step of storing in the storage medium a representation of the pointing device movement information includes the step of sampling the pointing device movement information to generate a plurality of data points indicative of the coordinate position of the cursor on the display.

8. A method for controlling operation of a computer system by an operator using a pointing device, said computer system including a keyboard, a display means for displaying visual information to said operator, processing means for generating and managing said visual information, memory means for storing temporary data and at least one program running in said computer, and real-time clock means for providing synchronizing signals to said programs, said pointing device including means for generating movement information for moving a cursor to any of a plurality of cursor positions on said display means for pointing to information entities displayed thereon, binary control means for generating binary control information, and communication means for transmitting said movement information and said binary control information to said computer system, said method comprising the steps of:

(a) moving said cursor on said display means using said pointing device, said cursor defining cursor trajectories having at least one curved portion so that a cursor-heading, time signal obtained from any of said cursor trajectories varies along said cursor trajectories;

(b) sampling periodically said cursor positions and obtaining corresponding cursor-heading, time variation-profiles thereof; and (c) causing the computer system to execute specific commands when at least one of said cursor-heading, time variation-profiles obtained in step (b) is sufficiently similar to one of a plurality of pre-defined characteristic cursor-heading, time variation-profiles.

9. The method of claim 8, wherein said pointing device is an x-y pointing device and said display means is a substantially plane display means.

10. The method of claim 9, wherein said pre-defined characteristic cursor-heading, time variation-profiles include:

a zigzag-like horizontally oriented cursor movement;

a zigzag-like vertically oriented cursor movement;

a positive-going curled cursor movement; and a negative-going curled cursor movement.

11. The method of claim 10, further comprising the step of calculating an average cursor position over an extent of said cursor trajectories for obtaining a coarse pointing indication associated with said trajectories at the time said specific commands are executed.

12. The method of claim 11, wherein said specific commands are further combined with a status indication of a plurality of keys of said keyboard for modifying the function performed by said specific commands so that a plurality of additional commands are triggered by combining command cursor-movements with said plurality of keys.

13. The method of claim 12, wherein said additional commands include:

a copy command;

a paste command;

a cut command; and an undo command.

14. The method of claim 13, wherein said additional commands further include commands for bringing into view a plurality of pop-up windows containing visual objects for selecting additional command options.

15. The method of claim 14, wherein said pop-up windows are displayed at a screen position related to said coarse pointing indication for minimizing distances traveled by said cursor for pointing to said additional command options.

16. A mouse driver arrangement for controlling a pointing device connected to a computer system, said mouse driver arrangement including means for acquiring position information generated by said pointing device for moving a cursor to a plurality of positions on a display system connected to said computer system, means for acquiring binary control information generated by binary control means disposed on said pointing device for triggering program commands, and means for transmitting said position information and said binary control information to an operating system running in said computer system, said mouse driver arrangement further comprising:

means for periodically sampling said cursor positions and generating a cursor-heading, time signal thereof;

means for matching said cursor-heading, time signal to a plurality of characteristic cursor-heading, time variation-profiles; and means for generating strobe-signals when said cursor-heading, time signal is substantially similar to at least one of said characteristic cursor-heading, time variation-profiles so that said strobe-signals behave as virtual-button signals for triggering specific program commands.

17. The mouse driver arrangement of claim 16, further including means for calculating an average cursor position over an extent of a trajectory generated by said cursor positions for obtaining a coarse pointing indication associated with said cursor positions at the time said virtual-button signals are generated.

18. The mouse driver arrangement of claim 17, wherein said position information generated by said pointing device is a two-dimensional x-y signal.

19. The mouse driver arrangement of claim 18, wherein said characteristic cursor-heading, time variation-profiles include:

a zigzag-like horizontally oriented cursor movement;

a zigzag-like vertically oriented cursor movement;

a positive-going curled cursor movement; and a negative-going curled cursor movement.

20. The mouse driver arrangement of claim 19, wherein said computer system further includes a keyboard and said driver arrangement further includes means for acquiring a status indication of a plurality of keys of said keyboard so that said virtual-button signals are further combined with said status indication for modifying the function performed by said virtual-button signals for triggering a plurality of additional commands by combining command cursor-movements with said plurality of keys.

21. The mouse driver arrangement of claim 20, wherein said additional commands include:

a copy command;

a paste command;

a cut command; and an undo command.

22. The mouse driver arrangement of claim 21, wherein said additional commands further include commands for bringing into view a plurality of pop-up windows containing additional command options.

23. The mouse driver arrangement of claim 22, wherein said pop-up windows are displayed at a screen position related to said coarse pointing indication for minimizing distances traveled by said cursor for pointing to said additional command options.

* * * * *

UNITED STATES PATENT AND TRADEMARK OFFICE
CERTIFICATE OF CORRECTION

PATENT NO. : 5,745,719
DATED : April 28, 1998
INVENTOR(S) : F.D. Falcón

It is certified that error appears in the above-identified patent and that said Letters Patent is hereby corrected as shown below:

On the title page, and col. 1:

Item: [54]   Title   "COMMANDS" should read --COMMAND--

Signed and Sealed this

Fourteenth Day of July, 1998

Attest:

BRUCE LEHMAN

Attesting Officer    Commissioner of Patents and Trademarks